US006895054B2

United States Patent
Li

(10) Patent No.: US 6,895,054 B2
(45) Date of Patent: *May 17, 2005

(54) DYNAMIC BIT RATE CONTROL PROCESS

(75) Inventor: Adam H. Li, San Diego, CA (US)

(73) Assignee: DivXNetworks, Inc., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/256,476

(22) Filed: Sep. 27, 2002

(65) Prior Publication Data

US 2003/0081672 A1 May 1, 2003

Related U.S. Application Data

(60) Provisional application No. 60/325,639, filed on Sep. 28, 2001.

(51) Int. Cl.[7] .................................................. H04B 1/66
(52) U.S. Cl. ............................ 375/240.13; 375/240.03; 375/240.05; 375/240.07; 375/240.26; 375/240.24; 382/239; 382/251
(58) Field of Search ....................... 375/240.13, 240.03, 375/240.05, 240.07, 240.24, 240.26; 382/239, 251, 232, 253; 386/112, 111

(56) References Cited

U.S. PATENT DOCUMENTS

| 5,650,860 A | * | 7/1997 | Uz ........................ 375/240.24 |
| 5,686,964 A | * | 11/1997 | Tabatabai et al. ....... 375/240.24 |
| 5,949,956 A | * | 9/1999 | Fukuda ........................ 386/112 |
| 5,999,218 A | * | 12/1999 | Yokoyama ............. 375/240.05 |
| 6,151,360 A | * | 11/2000 | Kato et al. ............. 375/240.03 |
| 6,160,846 A | * | 12/2000 | Chiang et al. .......... 375/240.05 |
| 6,480,539 B1 | * | 11/2002 | Ramaswamy .......... 375/240.03 |
| 6,535,251 B1 | | 3/2003 | Ribas-Corbera |

FOREIGN PATENT DOCUMENTS

WO    WO 03/028237    4/2003

OTHER PUBLICATIONS

International Search Report of PCT Application US02/30940, Mar. 3, 2003, 4 pages.
Mark R. Pickering et al., A Perceptually Efficient VBR Rate Control Algorithm, IEEE Transactions on Image Processing, vol. 3, No. 5, Sep. 1994, pp. 527–532.
Mark R. Pickering et al., A VBR rate control algorithm for MPEG–2 video coders with perceptually adaptive quantisation and traffic shaping; Signal Processing: Image Communications 11, 1997, pp. 1–19.
Dzung T. Hoang et al., Lexicographic Bit Allocation for MPEG Video, Journal of Visual Communication and Image Representation, vol. 8, No. 4, Article No. VC970376, Dec. 1997, pp. 384–404.
T.V. Lakshman, et al., VBR Video: Tradeoffs and Potentials, Proceedings Of the IEE, vol. 86, No. 5, May 1998; pp. 952–973.
MPEG4 Test Model 5, Rate Control and Quantization Contol. www.mpeg.org./MPEG/MSSG/tm5/.

* cited by examiner

*Primary Examiner*—Shawn S. An
(74) *Attorney, Agent, or Firm*—Christie, Parker & Hale, LLP

(57) ABSTRACT

A process of bit rate control includes asymmetrical reactions to changes in the signal density of the digital video signals. In the process, two different averaging periods are employed to meet a long term bit rate target and to achieve a short term quick reaction. When encoding a motion picture, the bit rate control is relaxed during high motion scenes to allow high peaks of bit rate at those points. The coding process reacts slowly to transitions from low to high motion sequences to preserve the best overall video quality, and reacts quickly to transitions from high to low motion sequences to enhance the image quality.

13 Claims, 3 Drawing Sheets

DYNAMIC BIT RATE CONTROL PROCESS

REFERENCE TO PRIOR APPLICATION

This application for patent claims, under 35 U.S.C. § 119(e), the benefit of the filing date of U.S. Provisional Application Ser. No. 60/325,639, titled "Improved Method and System for Dynamic and Asymmetric Bit-Rate Control in Video Encoding" and filed on Sep. 28, 2001.

FIELD OF THE INVENTION

The present invention relates, in general, to digital signal coding and compression and, more specifically, to dynamic bit rate and compression ratio control in a digital signal compression process.

BACKGROUNDS OF THE INVENTION

As electronics, in general, and consumer electronics, in particular, are equipped with faster chips and larger memories, consumers have come to expect them to be able to handle ever greater amounts of data and information. The data files that challenge device capacity typically include varieties of visual and pictorial contents, e.g., motion pictures, videos; and other complex computer graphics, e.g., those used in computer games. Technologies necessary for the handling, compression, and decompression of such data files related to visual and pictorial works are in great demand by consumers worldwide.

Compression of digital video signals for transmission or for storage has become widely practiced in a variety of contexts, especially in multimedia environments for motion pictures, video communication, computer games, Internet image/video streaming, digital television, and the like. Coding and decoding are accomplished with coding processors, which may be general computers, special hardware or multimedia boards, and other suitable processing devices. Standards for compression processes have been developed by the International Telecommunication Union (ITU), which has developed the H series standards used for real time communications such as those used in videophones, and the International Organization for Standardization (ISO), which has developed the Moving Picture Experts Group (MPEG) series standards, such as MPEG-1, MPEG-2, MPEG-4, and MPEG-7.

Digital video signals may include a sequence of pictorial data. The term "motion picture(s)" shall be used for convenience of expression, and shall mean any sequence of data amenable to quantization, at least a portion of which is pictorial. A motion picture usually includes many frames, and contains a large amount of information. However, the available storage space and bandwidth for transmitting such signals is often limited. Therefore, compression (coding) processes are used to achieve more efficient handling, transmission, or storage of the pictorial data.

Compression processes typically involve removal of the redundancy in the data, see U.S. Pat. Nos. 6,438,166 and 6,445,825. For the motion pictures, there usually exist a lot of similarities between consecutive frames. To remove these redundancies, the technology of "motion compensation" is usually used. Another redundancy that can be exploited is from the psycho-visual effect of human vision system. The human viewers cannot notice many minor variations in the images; thus the components that correspond to these unnoticeable variations can be coded approximately via a process called "quantization". Quantization is a process in which transformation coefficients of sample signal data values, like color and luminance, are represented by, or are mapped onto, a few values predefined by a quantizer. The quantized signal is composed of quantized values that are, in fact, approximations of the actual signal values. Therefore, the encoding of the signal data onto the quantized values necessarily produces some loss in accuracy and generates some distortion of the signal after the decoding process.

The value of the quantization scale used for the quantization highly affects a compression ratio in the coding processing. The larger the value of the quantization scale, the higher the compression ratio, resulting in a greater reduction in the quantity of the coded data. The smaller the value of the quantization scale, the lower the compression ratio, resulting in a less reduction in the quantity of the coded data. The value of the quantization scale can be set and changed in the course of data processing, thereby controlling the quality of the generated code. A small quantizer signals a small step of quantization; hence a high data bit rate and fine resolution. A larger quantizer signals a coarse quantization step; hence a low data bit rate and poor video quality.

Typical motion pictures consist of stretches of scenes with various amounts of motion. Scenes may be slow motion, e.g., a sunset or a couple walking on the beach; or high speed motion, e.g., a high speed car race. For high speed motion scenes, the video frames require much more bits to code than those in low speed motion scenes under the same quantizer. However, the mixture of high speed motion and low speed motion scenes and the transitions among them are drastically different from one video sequence to another. A high bit rate often exceeds the processing capacity of a video signal transmission/display/record device. On the other hand, a low bit rate often does not fully utilize the capacity of the transmission channel and recording media to achieve the maximum potential quality. Thus, in the encoding of digital video data, a persistent problem has been how to accommodate any given movie sequence, and to allocate the available bits among the scenes to achieve the maximum overall quality.

Some rate control methods simply use a fixed quantizer for all the different scenes, regardless of the degrees of motion. As described above, these methods generate coded bit stream with coded frame sizes and bit rates varying greatly from scene to scene. Since the fixed quantizer is selected before the encoding, a video sequence with a lot of high speed motion scenes will generate a coded bit stream of very large size, and a video sequence with mostly low speed motion scenes will generate a coded bit stream of relatively small size. Thus, in a method employing a fixed quantizer, there is no effective control over the bit rate.

One approach for controlling the bit rate in a data compression process uses a second order Rate/Distortion model to emulate the property of the video scenes. After the motion compensation of each video frame is performed, a sum of average difference (SAD) value is calculated to measure the residue error after motion compensation. The quantizer value is computed from the SAD value and the statistics of a short history of the last few frames. The image is then coded with the computed quantizer value. This approach is adopted in the Mobile Multimedia Systems (MoMuSys). MoMuSys is the standard reference implementation by ISO during its development of MPEG-4 standard. Although this approach has been shown to work in low bit rate mobile application environment, it does not give satisfactory results for the high bit rate encoding of motion pictures. Another challenge is that in dynamic coding, the coder only knows the past, i.e., the scenes that have already been encoded. The coder does not know the future, the scenes it has not processed as yet.

Accordingly, it would be advantageous to have a data compression and encoding method and system that permit governed responses to scene activity, which is sensitive to the contrast between high action and low action scenes. It is desirable for the method and the system to perform dynamic optimization of bit rate distribution among the frames for best overall quality. It is also desirable for the method and system to employ a long term memory, as compared to reacting only to the immediate level of action in a scene, so as to ensure overall bit rate convergence for the picture as a whole. It is further desirable for method and system to use the data regarding the preceding scenes, the history of any given encoding project, to generate decisions as to the remainder of the scenes, i.e., the future settings. It is would be of further advantage if the method and system are able to react quickly to the low speed motion scenes to achieve superior quality, especially those low speed motion scenes immediately following high motion scenes.

SUMMARY OF THE INVENTION

In a general aspect, the present invention provides a data compression and encoding method and system that are sensitive to the contrast between high action and low action scenes. In a specific aspect, the method and the system in accordance with the present invention perform dynamic optimization of bit rate distribution among the frames. In another specific aspect of the present invention, the method and system employ a long term memory relative to the reactions to immediate level of action in a scene to ensure overall bit rate convergence. In a further aspect of the present invention, the method and system are capable of reacting quickly to the low speed motion scenes to achieve superior quality.

A method of bit rate control in accordance with the present invention provides an asymmetrical reaction with respect to high speed motion and low speed motion scene sequences. The method also provides asymmetrical reaction with respect to the bit rate going in up and down directions.

Furthermore, the present invention provides a method of bit rate control wherein two different averaging periods are employed to meet a long term bit rate target and to achieve a short term quick reaction. In addition, the present invention provides a system of bit rate control, which includes using an adjustable coding quantizer or other bit rate controller that proportionate the current achieved bit rate with the target bit rate. According to an embodiment of the present invention, the bit rate control is relaxed during high motion scenes to allow high peaks of bit rate at those points. The coding means reacts slowly to transitions from low to high motion sequences to preserve the best overall video quality.

The present invention further provides a method of performing rate control that is capable of achieving a preset overall bit rate and further providing the ability to optimize the distribution among frames for best overall quality. The method can perform dynamic forecasting of average compensation using asymmetrical reaction to high speed and low speed motions. The average can be a simple average, a weighted average, e.g., an exponential moving average, or any other moving average methods. Two moving averages are used to record the average bit rates, both in a long averaging period for providing overall rate control and in a short reaction period for providing reaction to immediate change in scenes.

The long averaging period average determines the target bit rate for the current frame. The short reaction period average is then compared to the target bit rate. The quantizer and other coding parameters are adjusted accordingly in an asymmetrical manner. For example, the quantizer is turned up slowly if the reaction period average is above the long averaging period average, which usually signals a short term high motion burst. The quantizer is turned down quickly if the reverse is happening. The adjustment of the quantizer can be made proportional to the difference of the averages to avoid overreaction and oscillatory behaviors. Frame level quantizer can be determined before encoding the frame to enable better optimization of the encoding process.

The present invention further provides a method of bit rate control of a motion picture, wherein the motion picture has sequential sequences of moving picture frames, and the sequences of frames have dynamic bit rates which represent changes in motion. The method includes processing each frame in the sequences of the moving picture frames and providing asymmetrical reaction to bit rate changes between the sequences of each frame.

Further provided is a system of bit rate control of a motion picture, wherein the motion picture has sequential sequences of moving picture frames, and the sequences of frames have dynamic bit rates that represent changes in motion. The system comprises means for bit rate control that includes a coding quantizer that is adjusted in proportion to the difference between the current achieved bit rate and the target bit rate.

DETAILED DESCRIPTION OF EMBODIMENTS

Various embodiments of the present invention are described hereinafter with reference to the figures. It should be noted that the figures are only intended to facilitate the description of specific embodiments of the invention. They are not intended as an exhaustive description of the invention or as a limitation on the scope of the invention. In addition, an aspect described in conjunction with a particular embodiment of the present invention is not necessarily limited to that embodiment and can be practiced in conjunction with any other embodiments of the invention.

Figure 1:
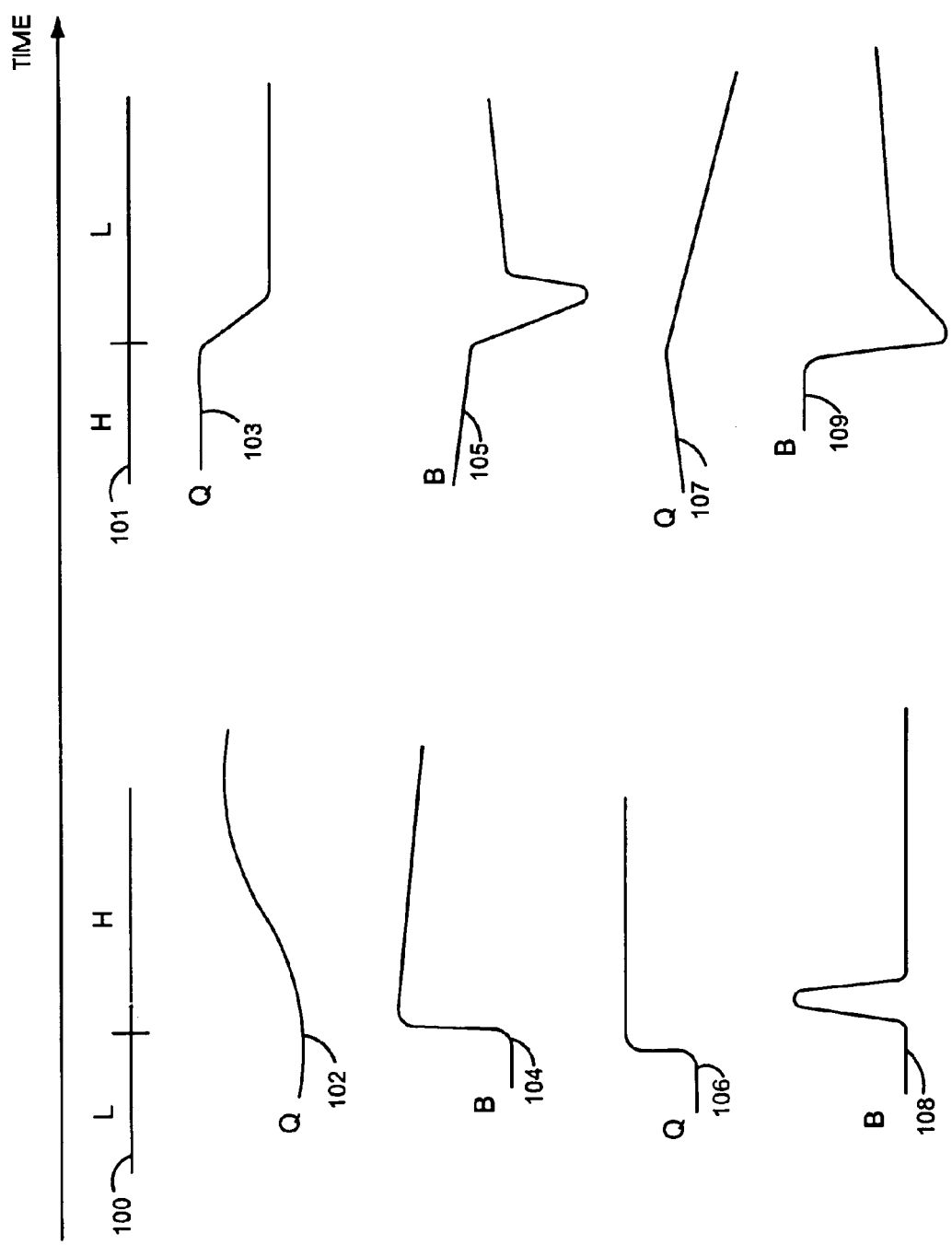
FIG. 1 is a timing diagram illustrating bit rate control schemes in accordance with the present invention.

FIG. 1 is a timing diagram illustrating bit rate control schemes in accordance with the present invention. In a typical motion picture, scene activity density may vary dramatically, sometimes over a short time period. In FIG. 1, a time line 100 depicts a transition period during which the scene activity density varies from a low (L) level to a high (H) level, and a time line 101 depicts another transition period during which the scene activity density varies from H to L. Curves 102, 103, 106, and 107 depict quantization scales during scene activity density transitions. Further, curves 104, 105, 108, and 109 depict bit rate during the scene activity density transitions.

When the scene activity density increases, a dynamic bit rate control process increases the quantization scale, thereby at least partially mitigating the effect of high scene activity density on the bit rate and avoiding the bit rate exceeding the hardware capacity.

Curve 102 depicts a slow increase in the quantization scale as the scene activity density increases. In other words, the quantization scale has a slow, gradual, or smooth on ramp, as indicated by curve 102, in response to the scene activity density increase. As a consequence of this gradual on ramp, the bit rate first increases as the scene activity density increases and then slowly decreases as the quantization scale increases, as shown by curve 104. The slow increase of the quantization scale as depicted in curve 102 is beneficial in preserving the image quality. In addition, the slow increase of the quantization scale may effectively avoid the overreaction of the quantization scale in response to the scene activity density increase. This is especially true when the increase in the scene activity density is temporary, which often takes place when there is a short burst of action in a motion picture.

On the other hand, curve 106 depicts a fast increase in the quantization scale as the scene activity density increases. Thus, the quantization scale has a fast or abrupt on ramp, as indicated by curve 106, in response to the scene activity density increase. As a consequence of this abrupt on ramp, the bit rate first increases as the scene activity density increases and then rapidly decreases as the quantization scale increases, as shown by curve 108. The rapid increase of the quantization scale as depicted in curve 106 results in an abrupt drop in the image quality. In addition, increasing the quantization scale abruptly in response to the increase in the scene activity density often results in overreaction of the quantization scale to the scene activity density increase, especially when the increase in the scene activity density is temporary, as in a short burst of, action in a motion picture.

In a dynamic bit rate control process in accordance with the present invention, the quantization scale decreases in response to a scene activity density decrease, thereby effectively improving the image quality and efficiently utilizing the hardware capacity.

Curve 103 depicts a rapid decrease in the quantization scale as the scene activity density decreases. In other words, the quantization scale has a rapid or abrupt off ramp, as indicated by curve 103, in response to the scene activity density decrease. As a consequence of this abrupt off ramp, the bit rate first decreases as the scene activity density decreases and then quickly increases as the quantization scale decreases, as shown by curve 105. The rapid decrease of the quantization scale as depicted in curve 103 effectively improves the image quality. The resulting increase in the bit rate as depicted in curve 105 efficiently utilizes the hardware capacity as soon as it becomes available due to the decrease in the scene activity density.

On the other hand, curve 107 depicts a slow decrease in the quantization scale as the scene activity density decreases. Thus, the quantization scale has a slow, gradual, or smooth off ramp, as indicated by curve 107, in response to the scene activity density decrease. As a consequence of this gradual off ramp, the bit rate first decreases as the scene activity density decreases and then slowly increases as the quantization scale decreases, as shown by curve 109. The slow decrease of the quantization scale as depicted in curve 107 results in a slow recovery of the image quality and inefficient use of the hardware capacity.

A larger quantizer or quantization scale will result in more compression to the video data, and hence lower quality. Although increasing the quantization scale to an extent is necessary to bring down the bit rate for high speed motion scenes, it is beneficial to increase it at a slow pace to preserve the image quality. A gradual slope in the guantization scale curve is also advisable to avoid over reaction to temporary short bursts of motions. However, the adjustment of the quantization scale in a transition from a high action scene to a low action scene is preferably rapid, as a slow reaction curve 107 shown in FIG. 1 is unappealing to a viewer. The viewer perceives slow response times as blurring or otherwise abnormal, or an out of ordinary viewing experience. Therefore, in accordance with the present invention, the dynamic bit rate control is preferably asymmetric with respect to the increasing and decreasing scene activity densities.

Figure 2:
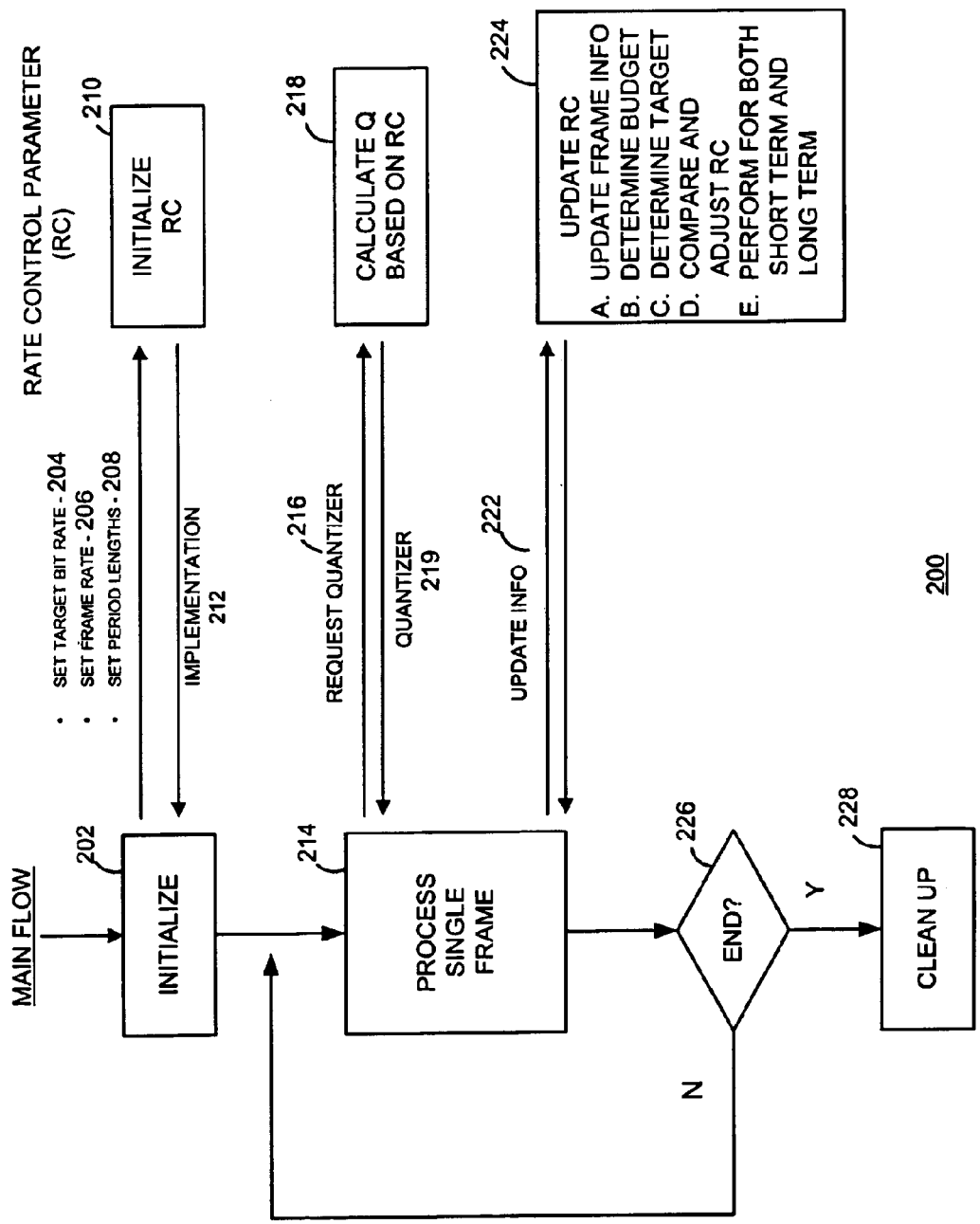
FIG. 2 is a flow chart illustrating a bit rate control process in accordance with the present invention.

FIG. 2 is a flow chart illustrating a process 200 for dynamically control bit rate in accordance with the present invention. Dynamic bit rate control process 200 begins with an initialization step 202, which includes targeting bit rate (step 204), setting frame rate (step 206), and setting period length (step 208). These steps provide information for initializing bit rate control parameters in a step 210. The bit rate control parameters are implemented in a step 212, thereby completing step 202 of initializing process 200.

After initialization, process 200 continues, in a step 214, with processing an image frame, which includes requesting a quantizer or quantization scale (Q) in a step 216. The quantizer Q is calculated in a step 218 based on the bit rate control parameters. As shown in FIG. 2, step 214 of processing the image frame is performed for a sequence of frames in process 200. Initially, step 218 of calculating the quantizer Q using the bit rate control parameters initialized in rate control initialization step 210. In a step 219, process 200 processes the image frame using the quantizer Q calculated in step 218. Furthermore, process 200 updates the bit rate control parameter in a step 224. The updated bit rate control parameters are used to calculate the quantizer Q for processing subsequent image frames (steps 214, 216, 218, and 219). Step 224 of updating the bit rate control parameters includes updating the information associated with the frame (step 224A); determining the budgeted bit rate (step 224B); determining the target bit rate (step 224C); and comparing and adjusting the resulting bit rate control parameters (step 224D). These steps are performed iteratively for both long and short term periods, as indicated by a step 224E in FIG. 2.

After processing the image frame, process 200 inquires whether there are addition image frames in a step 226. Process 200 repeats step 214 of processing an image frame in response to additional image frames. If there are no more image frames, process 200 ends after a final step 228 of cleanup.

Figure 3:
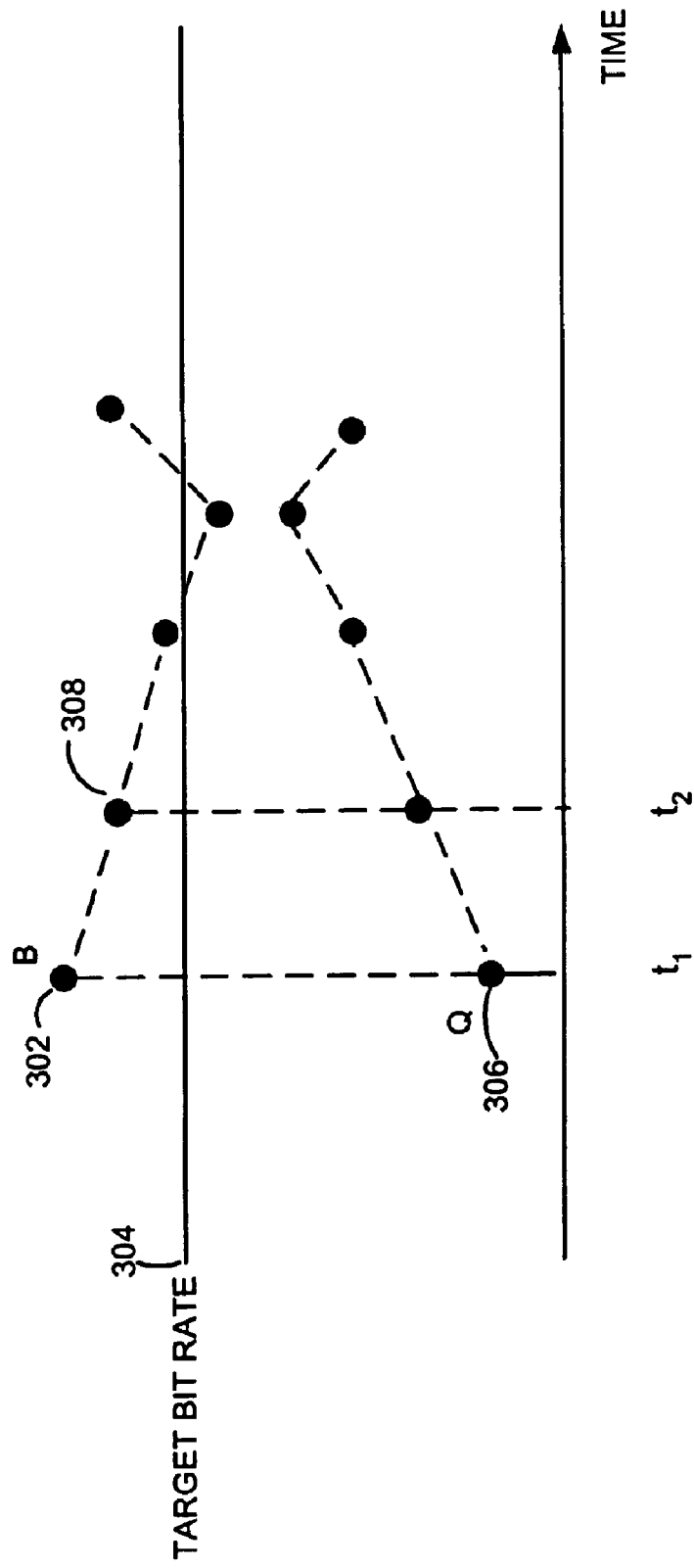
FIG. 3 is a timing diagram illustrating a method for adjusting quantizer in accordance with the present invention.

FIG. 3 is a timing diagram illustrating a method for adjusting quantization scale in accordance with the present invention. Specifically, FIG. 3 illustrates the relationship between a reaction average bit rate 302, at a time $t_1$, and a target bit rate 304. Reaction average bit rate 302 is the average over a short time period, which also referred to as a reaction period. It represents an estimate of how much the activity is in the most recent past. An estimate of target bit rate 304 is made based on the difference between a preset overall bit rate and a long term average bit rate. Target bit rate 304 is deduced from how the bit rate is spent or consumed in a long term perspective, and indicates how much bit rate would be available for future frames in order to keep the overall bit rate within or near the target setting.

The bit rate information described herein above is used for adjusting a quantizer or quantization scale (Q) 306. In accordance with an embodiment of the present invention, the adjustment to quantizer 306 is proportional to the differences between reaction average bit rate 302 and target bit rate 304. The amount of adjustment is also asymmetric with respect to the direction of the adjustment as described herein above with reference to FIGS. 1 and 2.

FIG. 3 also shows a short term or reaction averaging period bit rate average 308 at a time $t_2$, indicating the short term bit rate behavior after the quantizer adjustment. It also reflects the amount of motion in the current scene. Quantizer 306 is subsequently adjusted in proportion to the difference between average bit rate 308 at time $t_2$ and the target bit rate 304. This proportional adjustment of quantizer 306 avoids an oscillation of the bit rate around the desired target bit rate, in which a fixed increment/decrement step in the quantizer adjustment would result.

By way of example, a dynamic bit rate control process in accordance with the present invention is described herein below with reference to following parameters. It should be noted that the parameters might be correlated with each other. Changing in one parameter may require changes in another parameter to achieve and maintain a desired image quality. It should also be noted that a bit rate control process in accordance with the present invention is not limited to using these parameters. Dynamic bit rate control processes in accordance with various embodiments of the present invention may use all parameters described herein below, a subset of the parameters described herein below, additional parameters not listed herein below, or a combination of at least a portion of the parameters listed herein below with additional parameters.

"Bit Rate": Bit Rate represents a target bit rate of a data encoding/compression process. The unit of the Bit Rate can be bit per second, kilo-bit per second, byte per second, kilo-byte per second, etc. A rate control process in accordance with the present invention will try to react to the scenes of the sequence to achieve the target rate specified. In accordance with an embodiment of the present invention, Bit Rate includes only video signal bit. In accordance with another embodiment of the present invention, Bit Rate includes both video and audio signal bits.

"Averaging Period": This parameter controls how quickly the bit rate control process "forgets" the rate history. A large Averaging Period value typically results in a more accurate overall rate. Preferably, the value of Averaging Period should not be large in comparison with the length of a sequence image frames in a video program.

"Reaction": Reaction controls how quickly the bit rate control process adapts to a recent scene. Large Reaction values typically result in better quality high speed motion scenes, but lower quality low speed motion scenes.

"Up/Down Ratio": Up/Down Ratio controls the relative sensitivity in the reaction to high or low speed motion scenes. A large Up/Down Ratio indicates a large degree of asymmetry, which usually results in high quality high speed motion scenes at the cost of requiring consuming more of bits.

"Moving Average": Moving Average smoothes the series out and facilitates response to trends. This is especially helpful when the data associated with the motion picture is spiky, representing many changes from low action to high action scenes. The Moving Average is a changing quantity because as a new period is added, an old period is dropped. In one embodiment, Moving Average is calculated by taking the average value over a period. This is referred to as a simple Moving Average. The simple Moving Average represents a history of the frame characters and it lags behind data trends.

"Weighted Moving Average": In order to reduce the lag associated with the simple Moving Average, Weighted Moving Average is taken. Weighted Moving Average reduces the lag time by giving more weight to recent period data relative to old period data. The weight to the most recent period depends on the weighing factor. The larger the weighing factor, the more weight will be applied to the recent period. Compared with the simple Moving Average, the Weighted Moving Average reacts more quickly to the data changes.

"EMA (Exponential Moving Averages)": EMA is a special Weighted Moving Average. The EMA uses an exponential function as the weighing factor. Depending on the exponential function, the EMA can be heavily weighted toward recent periods, thereby effectively reducing the lag and increasing reaction speed to data changes. Using the EMA in bit rate allocation results in quick response for short data periods, thereby providing a key adjustable feature in a dynamic and asymmetric bit rate control process in accordance with the present invention.

It should be understood that other averaging methodologies may be employed in accordance with the present invention. For example, both sliding window averaging and frame decayed averaging are useful in averaging over a series of scenes in a similar manner as the EMA discussed herein above. A bit rate control process in accordance with the present invention can employ any averaging methods to provide desired averaging period and reaction time.

Another aspect of the present invention includes averaging over both short and long term. As indicated as step 224E in FIG. 2, the short and long term averages are calculated and used in an iterative manner to adjust the bit rate control parameters, and to inform and govern the processing of the image frames in step 214. The employment of dual periods for averaging, the long and short periods, yields the asymmetry in bit rate control in accordance with the present invention.

In accordance with an alternative embodiment of the present invention, the adjustment of the quantizer is implemented in predetermined proportional increments to avoid oscillation around the target rate. If the quantizer is adjusted in fixed increments, oscillation around the target rate would result and the picture quality would not be optimal. Proportional adjustment of the quantizer as a function of reaction speed and distance from the target rate provides the asymmetry that enhances the quality of pictorial works encoded by a system operating in accordance with the present invention.

A dynamic bit rate control process in accordance with the present invention can be implemented using a system that includes a signal processing unit. By way of the example, the signal processing unit may be a digital signal processor (DSP), a microprocessor ($\mu$P), a central processing unit (CPU), etc., and appropriate periphery equipment. The system may include general computers, special hardware or multimedia boards, and other suitable processing devices. Furthermore, the system may include standard commercial equipment, custom made equipment, or a combination of the both.

By now it should be appreciated that a data compression and encoding process and system that permit governed responses to scene activity have been provided. In accordance with the present invention, the process is sensitive to the contrast between high action and low action scenes and dynamically adjusts quantization scale and bit rate accordingly. This dynamic bit rate control process can perform dynamic optimization of bit rate distribution among the frames for optimal overall quality. In accordance with an embodiment of the present invention, the process employs a long term memory, as compared to reacting to immediate level of action in a scene, thereby ensuring overall bit rate convergence for the picture as a whole. Furthermore, the process and system are able to react quickly to the low speed motion scenes to achieve superior quality, especially those low speed motion scenes immediately following high motion scenes. In addition, by combining long term memory with quick reaction time, a process in accordance with the present invention is capable of using the data regarding the preceding scenes, the history of any given encoding project, to generate decisions as to the remainder of the scenes, i.e., future settings.

While various embodiments of the present invention have been described with reference to the drawings, these are not intended to limit the scope of the present invention, which is set forth in the appending claims. Various modifications of the above described embodiments can be made by those skilled in the art after browsing the specification of the subject application. These modifications are within the scope and true spirit of the present invention.

What is claimed is:

1. A method for controlling bit rate in a digital video signal comprised of a sequence of image frames, the method comprising the steps of:

sequentially processing each frame in the sequence of image frames; and adjusting a quantization scale at an asymmetric rate in response to a change in a signal density among the sequence of image frames by increasing a quantization scale at a first rate in response to an increasing signal density and decreasing the quantization scale at a second rate in response to a decreasing signal density, the second rate being higher than the first rate.

2. The method of claim 1, further comprising the steps of:

initializing a bit rate control parameter before processing a first frame in the sequence of image frames; and updating the bit rate control parameter before processing a subsequent frame in the sequence of image frames.

3. The method of claim 2, wherein the step of initializing a bit rate control parameter further includes the steps of:

setting a frame rate and targeting a bit rate; and setting a period length for averaging a portion of the sequence of image frames.

4. The method of claim 2, wherein the step of sequentially processing each frame includes calculating a quantization scale in response to the bit rate control parameter.

5. The method of claim 1, wherein:

the sequence of image frames includes a sequence of motion picture image frames having a dynamic scene activity; and the steps of increasing a quantization scale and decreasing the quantization scale further include achieving a balance between a consumption of the bit rate and a video quality of the motion picture.

6. The method of claim 5, wherein the steps of increasing a quantization scale and decreasing the quantization scale include reacting asymmetrically to a change in the scene activity in the motion picture.

7. A method for controlling bit rate in a digital video signal comprised of a sequence of image frames, the method comprising the steps of:

initializing a bit rate control parameter before processing a first frame in the sequence of image frames;

sequentially processing each frame in the sequence of image frames;

adjusting a quantization scale at an asymmetric rate in response to a change in a signal density among the sequence of image frames by increasing a quantization scale at a first rate in response to an increasing signal density and decreasing the quantization scale at a second rate in response to a decreasing signal density, the second rate being higher than the first rate; and updating the bit rate control parameter before processing a subsequent frame in the sequence of image frames by iteratively calculating a budgeted bit rate and a target bit rate for a first period length and a second period length shorter than the first period length.

8. A dynamic bit rate control process, comprising:

initializing a bit rate control parameter;

processing a first frame in a sequence of image frames;

updating the bit rate control parameter;

processing a subsequent frame in the sequence of image frames calculating a quantization scale in response to the bit rate control parameter by adjusting the quantization scale in proportion to a difference between a first average bit rate over a first time interval and a second average bit rate over a second time interval shorter than the first time interval; and adjusting a quantization scale asymmetrically in rate with respect to an increase and a decrease in a signal density among the sequence of image frames.

9. A method for controlling bit rate in a digital video signal comprised of a sequence of image frames, the method comprising the steps of:

initializing a bit rate control parameter before processing a first frame in the sequence of image frames;

sequentially processing each frame in the sequence of image frames;

calculating a quantization scale in response to the bit rate control parameter by adjusting the quantization scale in proportion to a difference between a first average bit rate over a first interval and a second average bit rate over a second interval shorter than the first interval; and adjusting the quantization scale at an asymmetric rate in response to a change in a signal density among the sequence of image frames by increasing a quantization scale at a first rate in response to an increasing signal density and decreasing the quantization scale at a second rate in response to a decreasing signal density, the second rate being higher than the first rate.

10. A dynamic bit rate control process, comprising:

initializing a bit rate control parameter;

processing a first frame in a sequence of motion picture image frames having a dynamic scene activity;

updating the bit rate control parameter;

processing a subsequent frame in the sequence of image frames; and reacting asymmetrically to a change in a signal density among the sequence of image frames by reacting asymmetrically to a change in the dynamic scene activity in the motion picture, increasing a quantization scale at a first rate in response to an increasing scene activity, decreasing the quantization scale at a second rate in response to a decreasing scene activity, the second rate being higher than the first rate, and achieving a balance between a consumption of the bit rate and a video quality of the motion picture.

11. A dynamic bit rate control process, comprising:
initializing a bit rate control parameter;
processing a first frame in a sequence of image frames;
updating the bit rate control parameter by iteratively calculating a budgeted bit rate and a target bit rate for a first period and a second period shorter than the first period;
processing a subsequent frame in the sequence of image frames; and
adjusting a quantization scale asymmetrically in rate with respect to an increase and a decrease in a signal density among the sequence of image frames.

12. The process of claim 11, wherein:
the sequence of image frames includes a sequence of motion picture image frames having a dynamic scene activity; and
adjusting a quantization scale asymmetrically further includes achieving a balance between a consumption of the bit rate and a video quality of the motion picture.

13. The process of claim 12, wherein adjusting a quantization scale asymmetrically further includes adjusting a quantization scale asymmetrically in response to a change in the dynamic scene activity in the motion picture.

* * * * *